United States Patent [19]
Gutshall

[11] 3,885,492
[45] May 27, 1975

[54] CAPPED FASTENER

[75] Inventor: Charles E. Gutshall, Rockford, Ill.

[73] Assignee: Elco Industries, Inc., Rockford, Ill.

[22] Filed: Nov. 16, 1973

[21] Appl. No.: 416,374

[52] U.S. Cl. ............................ 85/53; 85/1 JP
[51] Int. Cl.² .................. A47G 3/00; F16B 15/02
[58] Field of Search ................ 85/53, 54, 55, 1 JP

[56] References Cited
UNITED STATES PATENTS
3,425,313  2/1969  Villo ................................... 85/53
3,622,167  11/1971  Velthoven...................... 85/1 JP X FOREIGN PATENTS OR APPLICATIONS
1,176,415  11/1958  France ............................... 85/53

*Primary Examiner*—Ramon S. Britts
*Attorney, Agent, or Firm*—Wolfe, Hubbard, Leydig, Voit & Osann, Ltd.

[57] ABSTRACT

A fastener for attaching sheet metal paneling to the outside wall of a building includes a cap formed of a resilient, flexible material mounted with a snap-fit on the head of the fastener. A yieldable central web in the cap gives way to permit a driver to be inserted into a drive recess in the head of the fastener for tightening the fastener to the paneling. When the driver is removed from the recess, the web returns toward its original position to cover the recess so that the fastener compliments the appearance of the paneling and also is protected against the elements.

9 Claims, 11 Drawing Figures

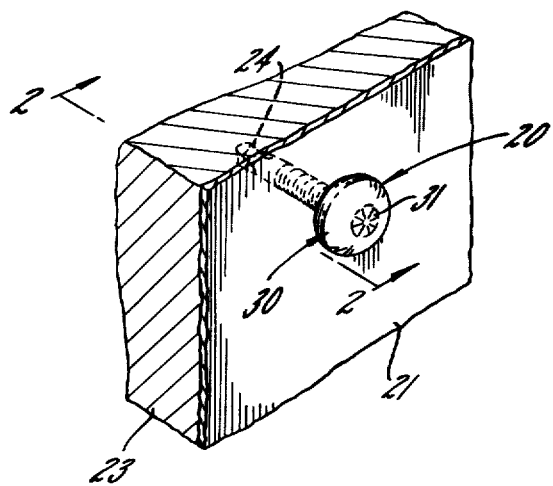
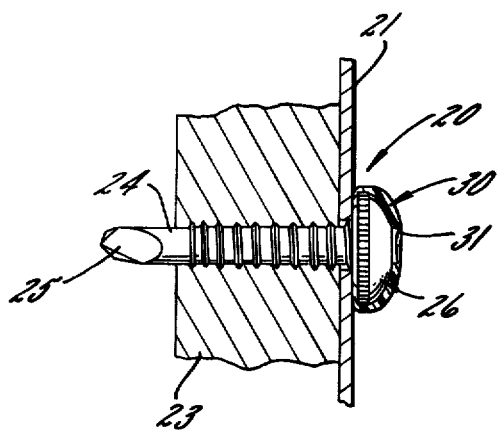
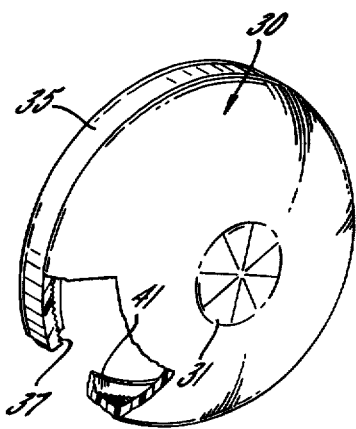
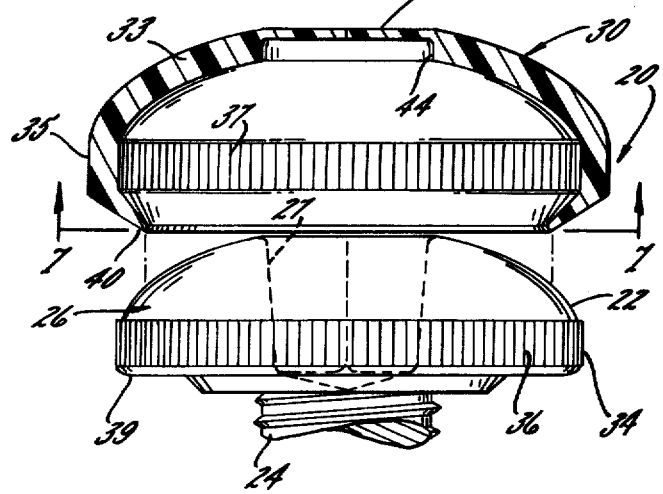
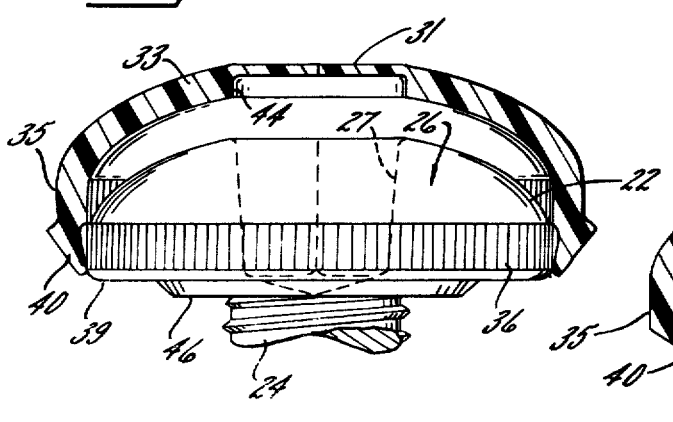
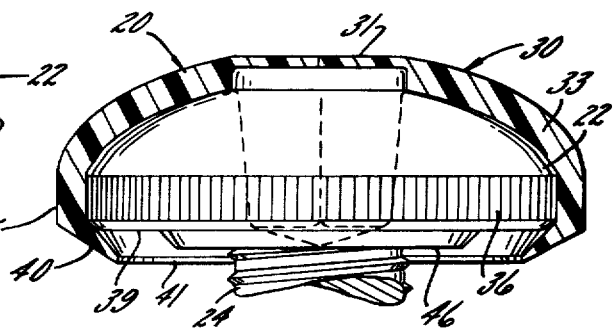

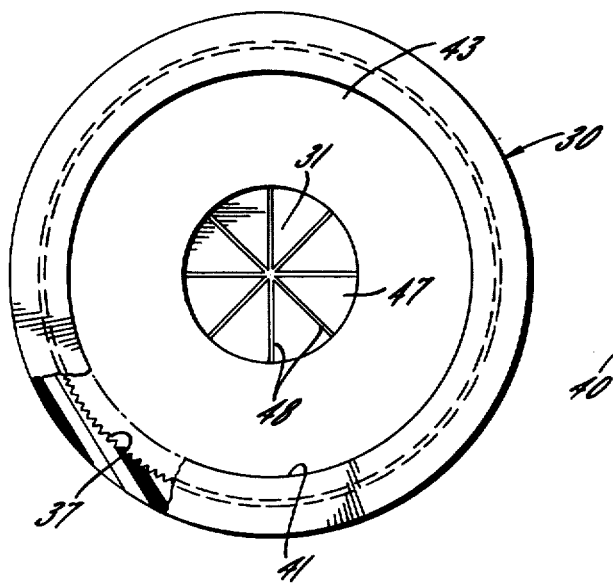
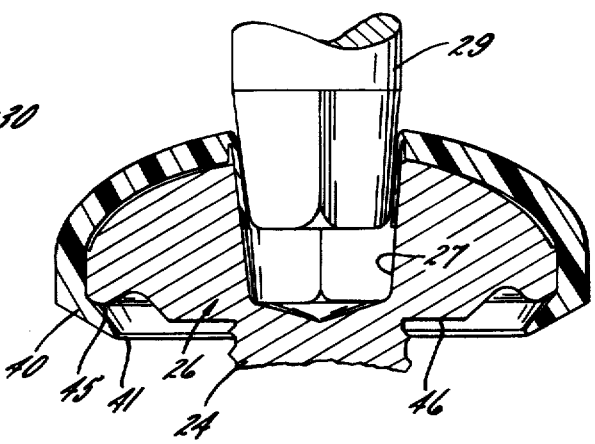
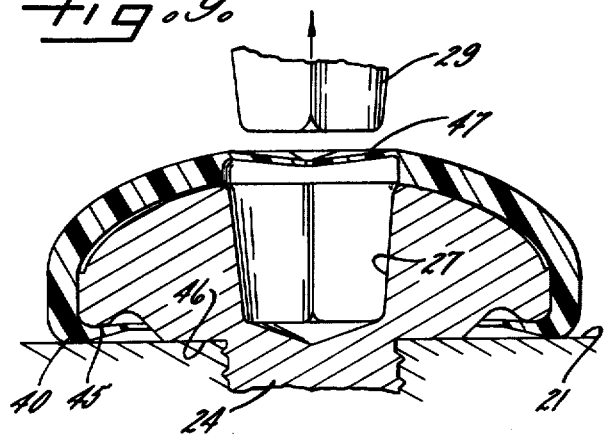
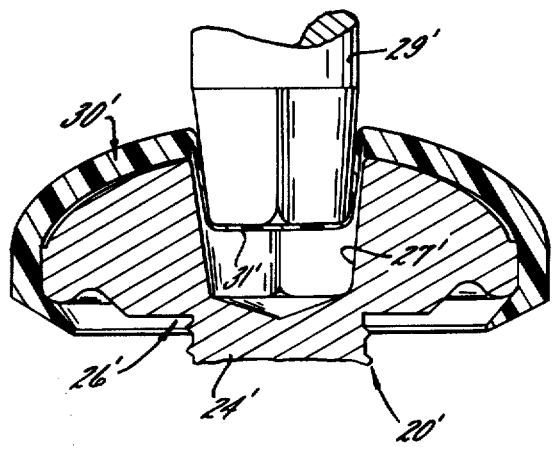
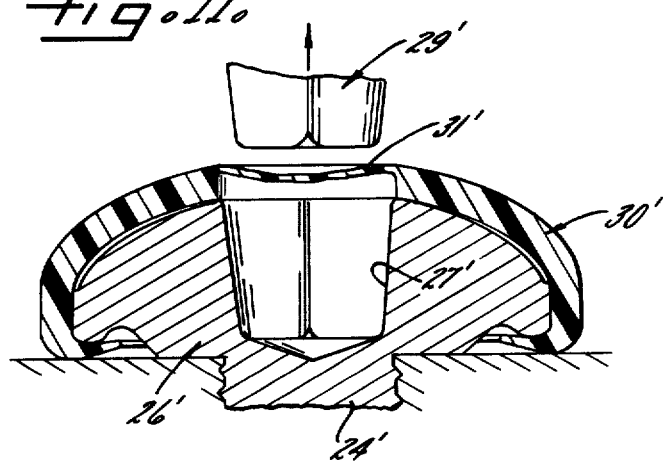

1

CAPPED FASTENER

BACKGROUND OF THE INVENTION

This invention relates generally to fasteners such as are used for securing sheet metal paneling to the outside wall of a building. More particularly, the invention relates to the type of fastener having a plastic cap or the like secured to the head of the fastener and colored to match the paneling so the fastener blends in with the paneling and is protected against corrosion to keep from possibly staining the paneling.

SUMMARY OF THE INVENTION

The primary object of the present invention is to provide a new and improved fastener of the above general character which is easier and less expensive to manufacture and which in service use is more pleasing in appearance than prior similar fasteners. More particularly, the foregoing is achieved by virtue of the novel construction of the cap to include a resiliently yieldable central web which normally covers a driver recess in the head of the fasteners so that, from the outside of the paneling, the head of the fastener appears rounded and smooth to compliment the appearance of the panel. When securing the fastener to the paneling, the web is deflected into the recess by the driver as the latter mates with the recess but, because the web is biased outwardly owing to its resiliency, when the driver is withdrawn, the web expands back toward its normal position to cover the recess.

Still further, the invention resides in the unique construction of the cap separately of the fastener so as to snap-fit on the head of the fastener for easy assembly therewith and in the provision of novel means on the cap and in the head of the fastener which coact to keep the cap from being turned relative to the fastener as the latter is tightened on the paneling In addition, the invention resides in the novel shape of the underside of the head of the fastener whereby a portion of the cap forms a seal between the outside surface of the paneling and the head of the fastener when the latter is tightened down thereby to protect the head of the fastener against corrosion.

These and other objects and advantages of the present invention will become more apparent from the following detailed description when taken in conjunction with the accompanying drawings.

BRIEF DESCRIPTION OF THE DRAWINGS

FIG. 1 is a fragmentary perspective view of a portion of a panel secured to the outside wall of a building by a fastener embodying the novel features of the present invention.

FIG. 2 is an enlarged fragmentary cross-sectional view taken substantially along line 2—2 of FIG. 1.

FIG. 3 is an enlarged perspective view of the cap with portions broken away for clarity of illustration.

FIGS. 4, 5 and 6 are fragmentary cross-sectional views of the fastener and cap showing various steps in the assembly of the cap with the fastener.

FIG. 7 is an enlarged view taken substantially along line 7—7 of FIG. 4 with portions broken away and shown in cross section for clarity of illustration.

FIGS. 8 and 9 are fragmentary cross-sectional views, respectively, showing the driver being inserted and withdrawn from the driver recess of the fastener.

FIGS. 10 and 11 are cross-sectional views similar to FIGS. 8 and 9, respectively, of an alternative embodiment of the invention.

DETAILED DESCRIPTION OF THE PREFERRED EMBODIMENTS

As shown in the drawings for purposes of illustration, the present invention is embodied in a fastener 20 such as a self-drilling screw of the type used in fastening sheet metal paneling 21 to the outside wall 23 of a building. Herein, the fastener includes a threaded shank 24 having a drill tip 25 integrally formed on one end thereof and an enlarged head 26 formed on the other end. In the upper surface 22 of the head is located a driver recess 27 adapted to receive a driver 29 (FIG. 8) for driving the screw 20 to drill through the paneling and into the wall to secure the paneling on the wall.

In service use, it has been found desirable that the head 26 of the screw 20 be capped with a rust-proof material such as plastic so that the exposed head of the screw is protected against corroding and possibly staining the outer surface of the paneling 21. An added advantage of capping the screw with plastic is that the plastic may be colored to conform with the color of the paneling so the screw head blends in with the paneling and thus does not detract from the overall appearance of the paneling.

In accordance with the primary aspect of the present invention, provision is made of a unique cap 30 which enables the fastener or screw 20 to be manufactured more easily and less expensively and which, in service use, is more pleasing in appearance than prior similar fasteners. For this purpose, the cap includes a resiliently yieldable web 31 normally disposed across and covering the driver recess 27 in the upper surface 22 of the head 26 of the fastener. In use, the web is pushed into the recess by the driver 29 when the latter is mated with the recess for tightening of the fastener to secure the paneling 21 to the wall 23. By virtue of its resiliency, the web moves outwardly of the recess to again cover the latter once the driver is withdrawn so that the fastener not only presents a rounded and smooth button-like appearance complimenting the outside of the paneling but, also, serves to protect the fastener against corrosion.

In the present instance, the cap 30 is generally circular in cross section and, advantageously, is formed separately of the fastener or screw 20 to fit easily on the head 26 of the screw with a snap-fit. More particularly, the cap includes an upper side 33 which engages the upper surface 22 of the head of the screw. Integrally formed with and depending from the upper side to extend along a peripheral edge 34 of the head is a skirt 35. Formed in the edge of the head are a plurality of vertical serrations 36 (FIG. 4) extending completely around the head. Mating vertical serrations 37 are formed in the inside surface of the skirt (see FIG. 3) and interfit with the serrations in the edge of the head to keep the cap from turning relative to the screw as the latter is tightened on the paneling 21. Extending in a generally radial direction inwardly and beneath the lower side 39 (FIG. 6) of the head from the lower margin of the skirt is an integral annular lip 40. Herein, the lip is of an inverted frustoconical shape and includes a lower edge 41 which defines circular opening 43 (FIG. 7) in the bottom of the cap. The diameter of the opening is less then the diameter of the head of the screw so that when the cap is pressed on the head of the screw, the lip flexes radially outwardly to snap fit over the head (see FIG. 5).

As shown in FIG. 4, the web 31 is formed integrally with the upperside 33 of the cap 30 in the center portion thereof and is disposed across the driver recess 27 to conceal the latter from view. Preferably, the center portion of the cap is recessed upwardly from the inside by a flat circular depression 44 to form the web so that the latter is substantially thinner than the remaining portion of the upper side and so the upper side of the cap presents a rounded and smooth appearance without any substantial depressions or cavities.

In the first embodiment of the invention illustrated in FIGS. 1 through 9, the web 31 comprises a plurality of pie-shaped segments 47 (see FIG. 7) herein eight, defined by eight scored lines 48 extending radially outwardly from the center of the web. When the driver 29 is mated with the driver recess 27 in the head 26, the web fractures along the scored lines and the segments are folded into the recess by the driver bending along the outer periphery of the web as shown in FIG. 8 to fit between the driver and the walls of the recess. Advantageously, owing to the resiliency of the web, when the driver is withdrawn after tightening the screw 20 on the paneling 21, the segments move back outwardly of the recess (see FIG. 9) to again conceal the latter so the screw compliments the outward appearance of the paneling.

In an alternative form of the invention, illustrated in FIGS. 10 and 11 wherein corresponding parts of the screw 20' and the cap 30' are indicated by the same but primed reference numerals as in the first form of the invention, the web 31' is formed of a stretchable plastic material. Accordingly, the web simply is stretched into the recess 27' by the driver 29' rather than fracturing. Then, when the driver is withdrawn, the web contracts back toward its original shape (see FIG. 11) to again conceal the recess from view.

To provide a weather-proof seal between the paneling 21 and the lower side 39 of the screw 20 or 20', in both embodiments of the invention, the lower side of the head 26 of the screw includes an annular ridge 45 integrally formed therewith and extending downwardly from the peripheral edge 34 thereof. When the screw is tightened on the paneling, the ridge pressure the lip 40 tightly against the outer surface of the paneling 21 so the underside of the screw is sealed against corrosion. Advantageously, a downwardly projecting shoulder 46 also is integrally formed with the underside of the screw and extends downwardly slightly beyond the ridge to keep the latter from cutting through the lip. As shown in FIG. 8 the shoulder is spaced radially inwardly of the lower edge 41 of the lip and extends past the ridge a distance less than the thickness of the lip so that when the screw is tightened on the paneling, the shoulder engages the outer surface thereof and keeps the ridge from cutting through the lip while still allowing the ridge to press the lip against the paneling with enough force so as to form an effective weather-proof seal.

In view of the foregoing, it is readily seen that the fastener or screw 20 of the present invention is particularly adapted for easy and inexpensive manufacture by virtue of the unique cap 30 which lends itself to easy assembly with the screw head 26. More importantly, in use, the screw presents a rounded and smooth button-like appearance on the paneling 21 to compliment the outward appearance of the paneling. This is achieved by virtue of the resiliently yieldable web 31 which conceals the driver recess 27 in the head of the screw even after the screw is tightened on the paneling.

I claim as my invention:

1. A fastener adapted to be tightened in a member by a driver including a threaded shank, a head integrally formed with one end of said shank and having a driver recess formed therein, means connected to the underside of said head and projecting in a generally axial direction away from said head for engagement with the member to space the underside of said head from the member when said fastener is secured in the member, and a cap formed of a resilient, synthetic resinous material mounted on said head, said cap including an upper side of predetermined thickness, a peripheral skirt integrally formed with and depending from said upper side along the sides of said head, an annular lip integrally formed with and extending radially inwardly from the lower margin of said skirt along the underside of said head to hold said cap on said head, said lip having a thickness greater than the distance said means spaces the underside of said head away from the member so the lip is compressed and clamped tightly against the member by the head when said fastener is secured in the member, and means including a resiliently yieldable central web integrally formed in said upper side and normally disposed across said recess and covering the latter for resilient flexure into said recess as the driver is mated with said recess for turning said fastener said web being substantially thinner than said predetermined thickness of said upper side and resiliently moving outwardly of said recess and toward its original shape to again cover the recess as said driver is withdrawn therefrom.

2. A fastener as defined by claim 1 wherein said web includes a plurality of generally pie-shaped segments and a plurality of generally radial score lines dividing the web into said segments, said web fracturing along said score lines and said segments being folded into the recess as said driver is mated therewith to tighten the fastener in the member and moving outwardly of said recess to again cover the recess when said driver is withdrawn therefrom.

3. A fastener as defined by claim 2 including a plurality of serrations formed in said head around the periphery thereof, a plurality of mating serrations formed in the inner wall surface of said skirt and mating with the serrations on said head to keep said cap from being turned relative to said head.

4. A fastener as defined by claim 3 wherein the underside of said head includes an annular ridge integrally formed therewith extending downwardly therefrom and engaging said lip to clamp said lip sealingly to said member when the fastener is tightened therein.

5. A fastener as defined by claim 4 wherein said means includes a shoulder integrally formed with the underside of said head, located radially inwardly of and extending slightly below said ridge for engagement with the outer surface of said member to keep said ridge from cutting through said lip.

6. A fastener as defined by claim 1 wherein said web is formed of a stretchably resilient material so when pushed into said recess by said driver the web stretches without breaking and when the driver is withdrawn the web moves outwardly of the recess to again cover the latter.

7. A fastener adapted to be tightened on a member by a driver including a threaded shank, a head integrally formed with one end of said shank and having a driver recess formed therein, a cap formed of a resilient, synthetic resinous material mounted on said head, means including a resiliently yieldable central web within said cap and normally disposed across said recess and covering the latter, and means integrally formed with said cap, projecting beneath the underside of said head and securing said cap on said head prior to tightening said fastener in the member, said web being substantially thinner than adjacent portions of said cap, said first mentioned means permitting said web to be resiliently flexed into the recess by the driver when the latter is mated with the recess for tightening the fastener in the member and permitting said web to move resiliently outwardly of said recess and toward its original shape to again cover the recess as the driver is withdrawn from therefrom.

8. A fastener adapted to be tightened on a member by a driver including a threaded shank, a head integrally formed with one end of said shank, said head having a driver recess formed in the upper surface thereof, a generally circular peripheral edge and a plurality of vertically extending serrations formed in said edge, a cap formed of a resiliently flexible, synthetic resinous material mounted on said head and including an upper side engaging the upper surface of said head, a peripheral skirt integrally formed with and depending from said upper side along the edge of said head, said skirt having mating serrations formed in the inner surface of said skirt and interfitting with the serrations in said edge to keep the cap from turning relative to said head, an annular lip integrally formed with and extending radially inwardly from the lower margin of said skirt along the underside of said head so as to form a seal between said head and said member when the fastener is tightened in the member and whereby said cap snap-fits on said head prior to securing said fastener in the member, a resiliently yieldable central web integrally formed in said upper side, said web being substantially thinner than adjacent portions of said cap, and disposed across said recess to cover the latter, said web including a plurality of generally pie-shaped segments, a plurality of generally radial score lines dividing said web into said segments and being fractured along said score lines by said driver as the latter resiliently folds said segments inwardly into said recess when mated with the recess for tightening the fastener in the member, said segments resiliently moving outwardly toward its original shape to again cover said recess when the driver is withdrawn from the recess.

9. A fastener adapted to be tightened on a member by a driver including a threaded shank, a head integrally formed with one end of said shank, said head having a driver recess formed in the upper surface thereof, a generally circular peripheral edge and a plurality of vertically extending serrations formed in said edge, a cap formed of a stretchable, synthetic resinous material mounted on said head and including an upper side engaging the upper surface of said head, a peripheral skirt integrally formed with and depending from said upper side along the edge of said head, said skirt having mating serrations formed in the inner surface thereof and interfitting with the serrations in said edge to keep the cap from turning relative to said head, an annular lip integrally formed with and extending radially inwardly from the lower margin of said skirt along the underside of said head so as to form a seal between said head and said member when the fastener is tightened in the member and whereby said cap snap-fits on said head prior to securing said fastener in the member, and a resiliently yieldable central web integrally formed in the upper side of said cap, said web being substantially thinner than adjacent portions of said cap and disposed across said recess to cover the latter, said web further being resiliently stretched by said driver into said recess without breaking as the driver is mated therewith for tightening the fastener in the member and resiliently contracting outwardly of said recess toward its original shape to again cover the recess with the driver is withdrawn.

* * * * *